(12) United States Patent
Agarwal et al.

(10) Patent No.: US 9,076,153 B2
(45) Date of Patent: Jul. 7, 2015

(54) METHOD, MEDIUM, AND SYSTEM FOR DETECTING DATA MISUSE

(75) Inventors: Anurag Agarwal, Sunnyvale, CA (US);
Rajas Moonka, San Ramon, CA (US);
Oren E. Zamir, Los Altos, CA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 13/088,058

(22) Filed: Apr. 15, 2011

(65) Prior Publication Data

US 2011/0258064 A1    Oct. 20, 2011

Related U.S. Application Data

(60) Provisional application No. 61/325,205, filed on Apr. 16, 2010.

(51) Int. Cl.
*G06Q 30/00* (2012.01)
*G06Q 30/02* (2012.01)
*G06Q 30/06* (2012.01)

(52) U.S. Cl.
CPC ............ *G06Q 30/02* (2013.01); *G06Q 30/0601* (2013.01)

(58) Field of Classification Search
CPC ................................................. G06Q 30/0601
USPC .............................................. 705/26.1, 27.1
See application file for complete search history.

(56) References Cited

U.S. PATENT DOCUMENTS

| | | | |
|---|---|---|---|
| 2003/0191812 A1* | 10/2003 | Agarwalla et al. | 709/217 |
| 2008/0103903 A1 | 5/2008 | Flake et al. | |
| 2008/0228578 A1* | 9/2008 | Mashinsky | 705/14 |
| 2009/0106100 A1 | 4/2009 | Mashinsky | |
| 2009/0292647 A1 | 11/2009 | Porat et al. | |
| 2010/0106645 A1* | 4/2010 | Peckover | 705/50 |

OTHER PUBLICATIONS

Stephen Hinde, Confidential data theft and loss: stopping the leaks, Computer Fraud & Security, vol. 2004, Issue 5, May 2004, pp. 5-7.*
International Search Report for International Patent Application No. PCT/US11/32775 dated Jun. 27, 2011.

* cited by examiner

*Primary Examiner* — Matthew Zimmerman
(74) *Attorney, Agent, or Firm* — Fish & Richardson P.C.

(57) ABSTRACT

In general, a computer-implemented method of managing data exchange includes registering a plurality of data sellers with a computer-implemented data exchange; registering a plurality of data buyers with the computer-implemented data exchange; mediating data sharing arrangements between pairs of the buyers and sellers, the arrangement defining prices and permitted uses of data provided by a data seller to a data buyer; and enforcing, on behalf of the data seller, restrictions imposed by the negotiations on data use by the data buyer.

12 Claims, 4 Drawing Sheets

METHOD, MEDIUM, AND SYSTEM FOR DETECTING DATA MISUSE

CROSS-REFERENCE TO RELATED APPLICATIONS

This application claims the benefit of priority of U.S. Provisional Patent Application No. 61/325,205, filed Apr. 16, 2010. The subject matter disclosed in that application is hereby incorporated by reference as if set forth herein in full.

TECHNICAL FIELD

This document relates to mechanisms by which parties may buy and sell data, such as data used for targeting of on-line interest-based advertising.

BACKGROUND

The number of services available over the internet grows every day. The most noticeable of these services are aimed at consumers—web search, maps, hosted documents and spreadsheet, location-based services, and the like.

Less noticed are web-based services that are available for businesses. One prominent service is on-line targeted advertising, where a business can submit ad copy, some targeting keywords, and a bid, and can have its ads shown to web users in situations where the keywords are relevant. This form of advertising can be very simple, with a small business logging in and running a handful of ads. It can also be extremely complex, with large ad agencies or advertisers running hundreds of campaigns with thousands of ads, selecting particular web sites to run their ads, and fine-tuning a number of parameters to maximize the effectiveness of the ad campaigns.

Certain companies generate data as part of their operations and certain other companies may desire access to that data. For example, an automotive web site may be able to generate data that indicates which of its visitors are likely to buy a car in the next six months. This information—that the consumer is actually ready to spend, and not just window shopping—can be incredibly valuable to a seller of automobiles. It can in turn be valuable to a company, such as an on-line publisher, that sells ad space to sellers of automobiles. For example, an on-line newspaper could promise an auto maker that the publisher will show its ads only to people ready to purchase an automobile, and can charge an extra amount for that service. Likewise, the publisher could get from the automotive website information about whether a consumer is interested in big cars or small cars, and the publisher could target ads appropriately.

SUMMARY

In general, in one aspect, a computer-implemented method of managing data exchange includes registering a plurality of data sellers with a computer-implemented data exchange, registering a plurality of data buyers with the computer-implemented data exchange, mediating data sharing arrangements between pairs of the buyers and sellers, the arrangement defining prices and permitted uses of data provided by a data seller to a data buyer, and enforcing, on behalf of the data seller, restrictions imposed by the negotiations on data use by the data buyer.

In general, in another aspect, a method performed on a data exchange entity includes receiving, at a data exchange entity from a data seller, a user data list that includes a plurality of user identities and one or more characteristics associated with the plurality of user identities, receiving, at the data exchange entity, one or more seller-defined terms that govern the use of the user data list by one or more data buyers, the seller-defined terms including a price for accessing the list, presenting the user data list and the seller-defined terms to one or more data buyers, receiving a selection of the user data list from the one or more data buyers, the selection including an agreement with the seller-defined terms, and compensating the data seller based at least in part on a determination that the one or more data buyers have used the user data list to target one or more content items to a user.

In general, in another aspect, a method includes electronically registering a plurality of data sellers with a computer-implemented data exchange, electronically registering a plurality of data buyers with the computer-implemented data exchange, mediating data sharing arrangements between pairs of the data buyers and data sellers, the arrangements defining prices and permitted uses of a first data list provided by a data seller to a data buyer, the first data list being for use in targeting content to users, providing access to the first data list to the data buyer for use in targeting content items to users, receiving additional data associated with the data buyer that has been uploaded for use in targeting content items to users by the data buyer, and determining, based at least in part on the additional data, that the data buyer has violated one or more of the permitted uses of the first data.

In general, in another aspect, a system includes a registration engine configured to electronically register a plurality of data sellers with a computer-implemented data exchange and electronically register a plurality of data buyers with the computer-implemented data exchange. The system also includes a mediation engine to mediate data sharing arrangements between pairs of the data buyers and data sellers, the arrangements defining prices and permitted uses of a first data list provided by a data seller to a data buyer, the first data list being for use in targeting content to users. The system also includes a data list manager configured to provide access to the first data list to the data buyer for use in targeting content items to users and receive additional data associated with the data buyer that has been uploaded for use in targeting content items to users by the data buyer. The system also includes an audit engine to determine, based at least in part on the additional data, that the data buyer has violated one or more of the permitted uses of the first data.

Aspects can include one or more of the following features.

The one or more characteristics include Internet browsing habits associated with the plurality of user identities.

Receiving a selection of the user data list includes receiving, from the one or more data buyers, an agreement to pay a subscription fee specified by the seller-defined terms.

Receiving a selection of the user data list includes receiving, from the one or more data buyers, an agreement to pay the data seller based on a determination that a content item has been presented to a user associated with the plurality of user identities.

The additional data includes a second data list, and wherein the determining includes comparing the second data list to one or more additional data lists to determine whether a similarity exists between the second data list and the one or more additional data lists.

The data buyer is identified as being in violation of the one or more permitted uses of the first data when the similarity exceeds a threshold.

The first data list includes a plurality of user identities and one or more characteristics associated with the plurality of user identities.

The additional data includes a dummy cookie received from the data buyer.

Determining that the data buyer has violated one or more of the permitted uses of the first data includes detecting a possession of the dummy cookie by the data buyer.

Detecting possession of the dummy cookie includes performing a data synchronization operation with the data buyer.

The additional data includes a dummy cookie received from a user.

Determining that the data buyer has violated one or more of the permitted uses of the first data includes determining that the data buyer has transmitted the dummy cookie to the user.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document discusses systems and techniques by which a third party may serve as an intermediary between parties that are seeking to sell data and parties that are seeking to buy, license, and/or otherwise use the data. The techniques described here may be implemented to permit buyers and sellers of data to establish ground rules for the use of the data using the third party, and the third party may employ controls and auditing mechanisms in order to help ensure that agreed upon limits were not exceeded. The sharing of data may occur with a common permission, across multiple platforms, such as platforms for identifying web users for ad targeting, platforms for generating other marketing information, and scientific data sharing platforms.

In this document, a system is discussed to (1) create an exchange where additional data sources can be layered onto the buying and reporting functions of ad buyers who manage active online ad portfolios; (2) provide a mechanism for a provider of advertising placement services in targeted on-line advertising to make available additional third-party data sources to buyers of advertising space on-line; (3) provide a mechanism for publishers, syndicates, and other data providers (aggregators, etc.) to securely monetize their own data; (4) provide a single place for users to securely view and manage the data associated with themselves; and (5) create opportunities for data-contributing publishers to also extract data for their own direct sales models.

A data exchange system as described herein may, in some examples, parallel the functionality of an online ads exchange system for actively targeting on-line advertisers.

Figure 1A:
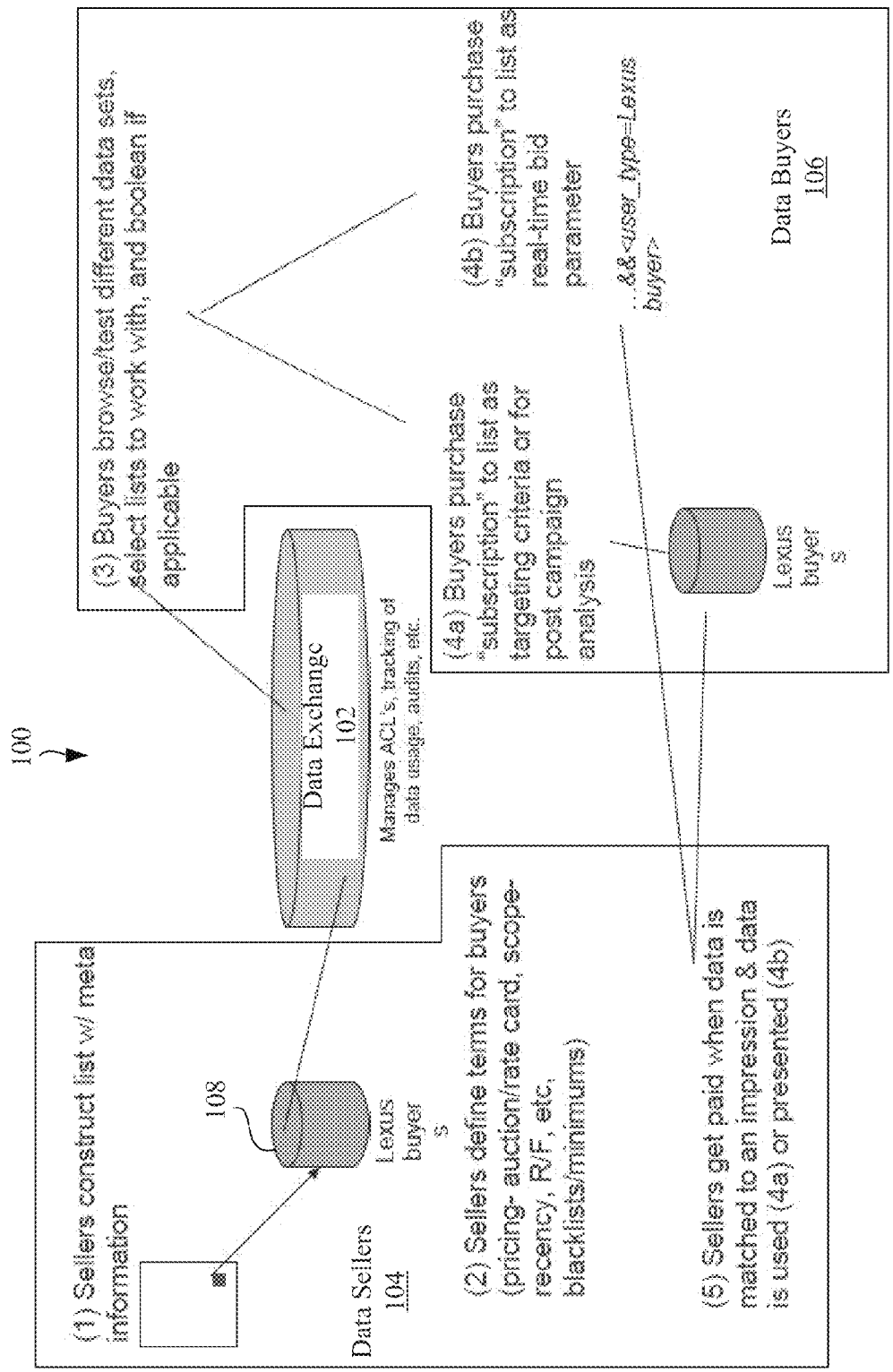
FIG. 1A is a schematic diagram, of a system and process for automatic on-line data sharing.

FIG. 1A is a schematic diagram of a system 100 and process for automatic on-line data sharing. In this example, a data exchange 102 is shown as managing access control lists (ACLs), tracking data usage, performing audits, compensating data suppliers 104 based on data usage by data buyers (licensees) 106, and other similar operations. In this example, the data buyer 106 is interested in identifying web users who have indicated that they might be interested in buying a Lexus® automobile. The seller 104 of the data may first construct a list 108 that includes meta information for the data they are offering to license or sell. The seller 104 can define some or all of the terms that buyers 106 must respect (e.g., pricing, auction/rate card, scope-recentness, R/F, and other such terms).

With the data made available, buyers 106 may then browse various data sets, which the exchange 102 may organize into logical groupings (e.g., weather data, customer data with various sub-groups for particular products, etc.). The buyers 106 may select one or more of the data sets, and the selection may signify an agreement with the seller-defined terms, any relevant laws, and/or any terms defined by the data exchange 102. The selection of one or more of the data sets may also signify that the buyers 106 have agreed to compensate the sellers 104 in the manner specified by the seller-defined terms. Buyers 106 may then subscribe to data, which will result in the exchange 102 providing the buyers 106 with access to the data for the subscription period, and may impose use restrictions on the buyers 106 during the period. In this example, the data is used for ad targeting so, at state 5, the data seller 104 may receive automatic payment when its data (e.g., the data associated with the list 108) is used to create a recognition event, such as the generation of an on-line targeted ad impression, or a user click on an ad.

Figure 1B:
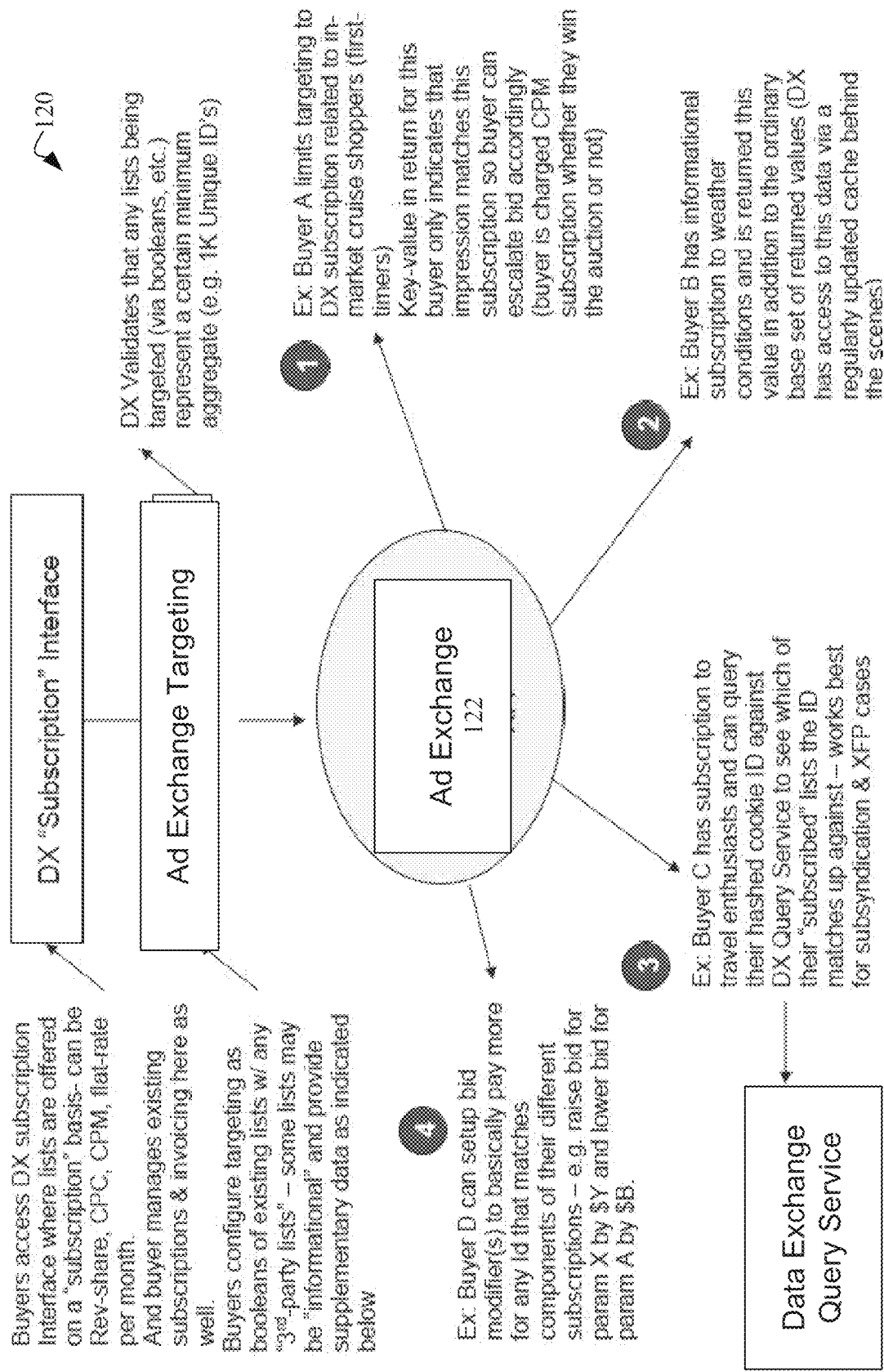
FIG. 1B is a schematic diagram showing interactions with a data sharing platform.

FIG. 1B is a schematic diagram that shows a system 120 which illustrates possible interactions with a data sharing platform. At the center is an ad exchange 122, which may be a sub-portion of a larger data exchange (DX) platform (shown as 102 in FIG. 1A). Particular examples around the platform show examples of uses that buyers of data (e.g., buyers 106 (FIG. 1A)) may make of the data. For example, a buyer may wish to simply obtain real-time weather data to provide a widget (e.g., a computer application) for weather on the buyer's web page. When the page is generated, the widget may obtain the data from the exchange. Other examples are also shown for other users of data. Some possible uses and techniques associated with the systems 100, 120 are described below Data Overview In some examples, data may have a short shelf-life and may be valuable (e.g., in-market car or travel buyers). Other data may have a long shelf-life and can be more generic in nature, such as demographic data, geographic data or user-interest data. There are also distinctions between online and offline data sources. In some examples, a data exchange entity (described in further detail below) may allow for the establishment of a common set of ground rules that govern data collection and data use, and may require market participants to agree to rules in order to benefit from the collected data.

Selling Models/Features

In some examples, sellers of data (e.g., the sellers 104 shown in FIG. 1A) can include a variety of types of constituents. For example, sellers may include publishers (or syndicates of publishers) offering data related to a particular vertical (e.g., a syndicate of comparison shopping sites may offer data on in-market refrigerator shoppers). In some examples, social networks may also supply interest, profile, or social graph data, and aggregators (e.g., aggregators of data working with their own publisher syndicates), offline data suppliers, ad networks, performance optimizers (e.g., performance optimizers having proprietary composition lists), search engines, ad placement companies (e.g., ad placement companies that can provide data about interest segments and targeting signals), and generic data sources (e.g., weather and stock market information sources) can also provide additional information.

Sellers of data such as those describe above may have a wide range of concerns regarding their data. For examples, sellers may be concerned with maximizing the return from their data, data privacy/re-selling, aggregating and/or anonymizing themselves as a data source, abuse of data which could impact the seller's reputation with users, managing the scope of who can buy the data and how it will be purchased, and establishing optimal price points for the data to maximize yield.

In some examples, data may have a different value to buyers and sellers. One possible model for data exchange to bridge this difference in value between buyers and sellers is an auction mechanism where data can be bought and sold for whatever value the market decides is appropriate for that data. However, in some examples, for data that is more widely available, is persistent and/or for which there is little competition, publishers may wish to offload or sell their data via a subscription service or another non-auction model. Examples of these non-auction models will be described in greater detail below.

In some examples, multiple parameters may govern how data may be purchased and/or used. For example, the parameters may include competitive restrictions, geo-restrictions, resale restrictions, exclusivity provisions, use contingent with buying of other data, cookie coverage (e.g., effective yield on data-set constrained by a number of cookies returned divided by total available unique cookies), recentness of data, guarantees or other commitments on performance or volume, and whether the data can be used once or multiple times. In some examples, enforcing and/or auditing one or more of the parameters can be complicated by the inherent portability of data.

In some examples, the systems 100 and 120 (sometimes collectively referred to as "the systems") may permit integrated billing for use of data. For example, a buyer of data that improves ad targeting may pay a single price to have an ad displayed (e.g., using a cost-per-impression (CPM) metric, sometimes referred to as a cost-per-thousand-impressions) or clicked upon by users (e.g., using a cost-per-click (CPC) metric). A portion of that total price may automatically be allocated as payment to a provider of data that improved the targeting of the ad, to the party providing the data exchange platform, and to a publisher that hosts a page where the ad was delivered. As a result, a buyer of advertising may coordinate a total payment that it is willing to make both for having access to data in causing its ads to be placed, and also paying for impressions or click-throughs on the ads.

In some examples, the systems 100, 120 (possibly in combination with one or more additional entities) may provide auditing functionality. For example, as described in greater detail below (e.g., with regard to FIG. 1C), the systems 100, 120 may strive for technological assurance that a buyer (licensee) of the data is using the data within agreed-upon terms. For example, dummy cookies may be inserted into user lists and used for running dummy auctions, where the results of the auctions may be analyzed to ensure that data is being used correctly or is not being used beyond its agreed-upon duration. In addition, comparisons may be conducted across lists in order to find common characteristics for preventing data leakage and for discovering similar users. In such situations, multi-variable user identifications may be performed, such as to locate users who, for example, are both ready to purchase a car and who are also interested in foreign travel (e.g., for a European car company that wants to promote "factory pick up" sales).

In some examples, the systems can include features for preserving user privacy. For example, hashing may be performed on certain identifying information as to enable matches between different versions of data, but to prevent the determination of the original data. Also, different cookies may be stored for a domain that is managing the data integration, and the cookies may be accessed separately to provide integrated operation. However, to better maintain user privacy, information about at least one of the cookies may not be persistently stored with the domain, and may instead be stored in a separate location. Other similar mechanisms may also be employed so as to provide the benefits to users of better data integration while maintaining an appropriate level of user privacy.

Users who are the source of the data offered by data sellers and desired by data buyers may also receive a share of revenue that is derived from the data, and the systems 100, 120 may include techniques to further provide privacy in such situations. In some examples, such users may be provided with an opt-in mechanism by which they can voluntarily share more of the information than would normally be shared, and they may be compensated for sharing the additional information. Also, in some examples, information may be provided to users regarding the uses that are made of data that they provide, and users may also be informed about where data that originated from them is used.

Buying Models/Features

In some examples buyers of data (e.g., buyers 106) can include the following types of constituents: ad exchange network and agency buyers, on-line advertising content networks ad keyword buyers, and publishers contributing data to a data exchange or buying inventory on an ad exchange. Buyers 106 may also have a wide range of concerns, such as data quality concerns (e.g., when the data is obtained from multiple sources). Buyers 106 may also be concerned with questions regarding the value (or valuation) of the data (e.g., how useful will the data be for performance, and how can the relevant data be analyzed, especially if the data is mixed w/other noisier data sources?). Buyers 106 may also be concerned with privacy issues. For example, buyers 106 may wish to examine the extent to which the purchased data has been vetted, and may further desire information regarding the sources of the purchased data. Other concerns associated with the buyers 106 can include coverage concerns (e.g., if the data is list-based, how many of the cookies will they yield on media?), concerns regarding the ability of the data to be integrated into a real-time bidding scheme, concerns regarding whether the data is exclusive or unique in some fashion, concerns regarding whether the buyers 106 can share and/or use the data with other clients or parties, concerns regarding whether the data is tied to a particular ad exchange or a content network for ads, and data navigability concerns (e.g., how to navigate, browse, and/or evaluate a large number of unvetted data sources).

User Models/Features

In some examples, the consumers who are subjects of the data being bought and sold may desire some amount of transparency and control in the data collection and distribution processes. However, the desire for transparency can be at odds with the goals of sellers 104 who may wish to conceal the fact that they are providing data to third-parties. While some consumers may wish to limit the amount of data that they are associated with, some consumers may want to contribute additional data. The benefits of more relevant advertising are important user benefits. A model may be provided where data is made more persistent, for example, by pairing the data with some authentication so that the shelf-life of the data is extended.

Implementation Overview

In some examples, marketers may run effective ad campaigns by using one or more of the following ingredients: media (e.g., a selection of an ad inventory that the ad runs on), data (e.g., on what additional information is that ad targeted and priced?), timing (e.g., is the ad reaching the right user at the right time?), and pricing (e.g., is the advertiser paying a price that will provide a sufficient return on investment (ROI)?). The systems 100, 120 can use techniques and can provide features that promote the effective use of these four ingredients. For example, the systems 100, 120 can provide a list construction feature, which may provide a data supplier 104 with an easy way to define data and to associate metadata with the data. The systems 100, 120 may also provide list generation features, which may include methods to construct lists of publisher/seller data (e.g., via pixels, ad tags, custom code, etc.), and may provide selling screen features (e.g., interfaces through which publishers may list their data and supply the terms upon which it will be sold).

The systems 100, 120 may further provide buying screen features, which can be interfaces for buyers 106 to navigate and purchase data sets including query tools, categories, and the like. Additionally, the systems 100, 120 can provide an inventory server to catalog and present the available data against multiple criteria, and may provide billing, payment, reporting functionality (e.g., systems to manage the financial transactions and clearing between buyers 106 and sellers 104 and to present statements around what was transacted). In addition, the systems 100, 120 can provide list management features for buyers and sellers (e.g., a set of tools for managing data that has been constructed, or bought and used for targeting), as well as backend components for auctions for matching, identifying, and presenting ads. The systems 100, 120 may also include AW3 integration for providing presentations to ad network buyers, and techniques for vetting legal issues, policy issues, and privacy issues. In some examples, the systems 100, 120 can include user components such as an interface for user disclosures, as described in greater detail below.

In some examples, buyers 106 can access and use the data under three different usage models. For example, buyers 106 can (1) buy a pixel list with rights to use and re-use the data (constrained by whatever terms are provided by the seller 104); (2) rent or buy impressions on media owned by an ad service, which may be restricted to data specified by the buyer 106 as the basis for targeting the media; and (3) use an option to buy model which provides buyers 106 with the ability to first rent data and to then buy the data at a later time (e.g., by exercising an option).

In some examples, the buying model is based on pixel lists (sometimes referred to as a "per-pixel model," as above). Two ways that pixel lists can be generated include open or closed techniques. In some examples, open lists are lists that redirect to any third-party pixel and may provide additional logic around provisioning the pixel and modeling the pixel to deliver the optimal yield for a publisher. Closed lists can be stored in the DCLK cookie space and only served/stored by the data exchange 102 in the data exchange backend, which may not be directly visible to the buyers 106. Closed lists can benefit from the ability of being post-processed across a number of different dimensions. Open lists may be more attractive to the buyers 106 and may make data exchange more competitive against third-party data exchanges because, in some examples, buyers 106 like to model and use data across exchanges. Data can be collected using a smart-pixel which can have key-value parameters associated with it. This pixel can be introduced into existing tag implementations.

In some examples, the renting model can be based on the seller's 104 data matching the buyer's 106 "matched impression" in the ad exchange 102 or on an ad content network, which may be the impression which matches the targeting specified by the buyer 106. This model is sometimes referred to as a CPM model. In some examples, the buyer 106 only pays for the data that is matched to impressions that they are targeting via an ad exchange or ad content network, in addition to whatever other criteria or data they are overlaying. If the buyer 106 is using multiple data sets, the buyer 106 pays the stipulated fees to each of the sellers 104, but sellers 104 can federate or bundle different datasets together as well. In some examples, the seller 104 may decide whether the data will be passed or presented to the buyer 106 at the time of the matched impression. An example of this scenario is a seller (publisher) 104 offering user registration data or site URL data for any ads targeted to its own inventory. This also can be a component of a publisher offering buyers 106 the ability to buy the data after renting it for some period of time. As part of the rental model, the sellers 104 may bind the data to a timeframe (e.g. data from October 1-October 31) or they can make it current (e.g. always updating data skews).

The systems 100, 120 can also support pixel-free implementations for data collection, where data can be aggregated from log data associated with a specified tag. Data can also be supplied via cookie lists which are transferred in aggregate to the data exchange 102 as a data-escrow service. In addition, data can also be supplied against other keyed parameters (besides cookie-space), and the data exchange 102 would act as a date escrow or primary supplier. In some examples, the data exchange 102 may also collect data associated with geo-mapping, user-time-zone, or other data associated with a user-IP address, and the mapping could be managed through the data exchange 102. The data exchange 102 may also collect page-level targeting cues, with the mapping again being managed through the data exchange 102.

Pricing Models

In some examples, access to the data can be priced based on the following dimensions: per-pixel, per-cookie (e.g., only matched cookies), per-impression, per-click, per-action basis. Pricing can be set by the advertiser, or the prices can be determined by a live auction (e.g., in some examples, a particular buyer 106 may effectively lose an ability to access data if another buyer pays more for the data in the live auction). In the purchased data model, the service can offer a bundled price or credit towards media, which may effectively act as a bundled price.

Publisher Offloads their User-List Data in a Data Exchange:

In some examples, a publisher constructs a list in the data exchange 102, and the data exchange 102 begins building the list through pixels supplied via the data exchange 102. The data exchange 102 may associate the list with meta-data and selling criteria (e.g. exclusivity). The seller 104 may set a price point for the list (mimicking the direct-sales model) and the list may become visible to the buyers 106 in the data exchange 102. The seller 104 may also specify limits on which buyers 106 are permitted to see the list. In some examples, for "remnant data" (e.g., data that hasn't directly been purchased by a buyer 106, such as a previous month's data), the seller 104 may choose to offer that data via an auction. Examples of data that data sellers (e.g., publishers) can supply include social-network membership data and in-market data.

Network Offloads Their Targeting or Performance Data in Data Exchange:

In some examples, an ad network sells a list of high-converting users in the travel category (e.g. frequent travelers). The process for providing this data in a list on the data exchange 102 mimics the scenario above; however, the list may be quite expansive and can be stored in the network cookie-space. The list is matched to the data exchange 102 cookie space (e.g., at no cost) and can be made available to all permitted ad buyers. The same network may also buy ad content network categories for travel to further refine their ability to generate high-converting users.

Data Combined From Multiple Sources in Data Exchange:

In some examples, a buyer 106 may decide to buy a list that includes high-FICO score users and may combine that with data about users who recently conducted a search for mortgage rates. In the data exchange 102, the buyers 106 may purchase the FICO list and unite it with the mortgage buyer list to come up with a smaller list that meets both criteria. In some examples, the data exchange 102 may require a list having a specified number of users (e.g., a list of at least 100 ID's) for privacy purposes. The buyer 106 can purchase the resulting list on the ad exchange 102 (e.g., by paying for matched impressions against each data source), and can further expand the purchased list to a user data last that includes users within a social network of the users on the purchased user data list. Accordingly, the buyer 106 can exercise an option to purchase the rented data list, but may also buy an additional data list that includes social network peers to the people on the rented list. These techniques may result in a broader targeting list based on a logical "OR" union of the data lists.

Weather-Related Web Site Offloads Weather Data in Data Exchange:

In some examples, a weather forecasting site may offer to supply data on the weather for each viewer at run-time. This data can be passed as an additional data parameter to only those subscribers of this data in an ad exchange. Other bidders in the same auction may not see the same key value for current viewer weather. This allows the buyers 106 to adjust their offers and bids in real time based on the weather of the buyer. Other similar examples may include stock market data, profile information, scores for a local sporting event, and concerts/events being provided in a local area.

Figure 1C:
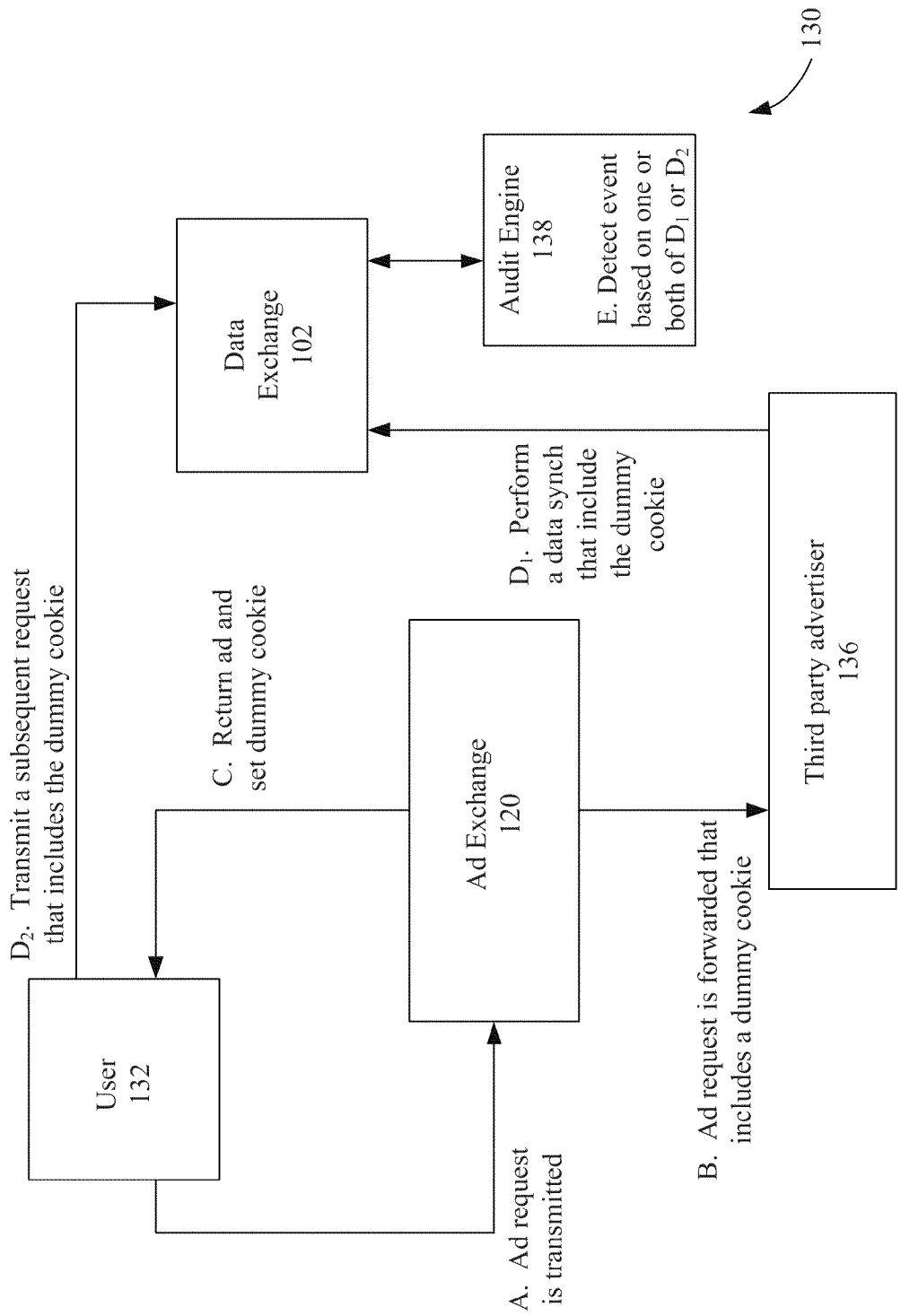
FIG. 1C is a schematic diagram showing interactions among a plurality of network entities.

FIG. 1C shows a system 130 for auditing the use of user related data provided by a seller (e.g., the seller 104). For example, if a third party advertiser 136 has purchased, through the data exchange 102, the right to access a user data list to target content items (e.g., advertisements) to users 132, sellers 104 of the user data list and the data exchange 102 may have an interest in limiting the third party advertiser's 136 use of the user data list. For example, after the third party advertiser 136 has agreed to one or more seller-defined terms of use regarding a purchased or rented user data list, the data seller 104 and/or the data exchange 102 may wish to enforce both the seller-defined terms of use, and any other legal or contractual obligations associated with the use of the user data list by the third party advertiser 136.

To that end, it can be useful to provide techniques (e.g., on the data exchange 102) for detecting improper uses of the user data lists by buyers 106, such as the third party advertiser 136. Some exemplary techniques will be described below with reference to FIGS. 1A-1C. Specifically, these examples below can be used to detect whether an advertiser 136 has copied some or all of a user data list to which it has access, so that the copied data could be used for free in place of the user data lists offered by the data exchange 102. The states described below can occur in the illustrated order, or in an order that is different from the illustrated order.

In state A, the ad exchange 120 receives an ad request transmitted from the user 132. For example, the user 132 may be operating a machine (e.g., a laptop computer) running an internet browser that issues an ad request in response to navigating to a web site that includes one or more ad slots. The ad request can include information (e.g., one or more cookies) that identifies the user in some way (e.g., a device ID of the user's machine or an identification of an account that the user is currently logged into). After receiving the ad request, it may be determined that the user 132 is associated with a user identification provided on one or more user data lists.

In state B, the ad exchange 120 forwards the ad request to the third party advertiser 136. Ad requests can be forwarded to third-party advertisers in some cases to allow the third party advertiser 136 to provide a real-time bid on an advertisement. That is, in some examples, instead of having pre-generated ad campaigns with predetermined bids for each ad, ad requests can be provided to third party advertisers 136 at auction time to receive a bid. In response to receiving the ad request, the third party advertiser 136 can submit a bid for use in the ad auction process, and can also submit one or more advertisements to present to the user 132 if the third party advertiser 136 wins the auction. In some examples, during the ad auction process, the ad exchange 120 may send the ad request to the third party advertiser 136 in order to request a bid for the auction. In some examples, the ad request forwarded to the third party advertiser 136 can include a "dummy cookie," which is a uniquely identifiable cookie that does not actually represent an identity of a user (e.g., the dummy cookie provided in state B would not represent the identity of the user 132).

In some examples, the third party advertiser 136 could attempt to reverse-engineer the user data list to which it is subscribed by attempting to extract and store the cookie which identifies the user 132. For example, a typical ad request may contain a request from a web page being presented on a user's 132 machine that includes one or more ad slots. When the user's 132 machine sends the ad request to the ad exchange 120, the request may also include a cookie that contains information that identifies the user 132, the user's machine, or some other identifying information associated with the user. However, using these techniques, the third party advertiser 136 could unknowingly extract and store the dummy cookie included in the ad request. The auditing techniques described herein can attempt to identify the dummy cookie stored in a list associated with the third party advertiser 136 to determine (with a relatively high probability) that the advertiser 136 has impermissibly copied a portion of the user data list to which it has purchased access through the data exchange 102.

In state C, the ad exchange 120 provides a content item (e.g., an advertisement) to be displayed, for example, in an ad slot associated with an Internet browser running on the user's 132 machine. In some examples, the ad exchange 120 can also provide a copy of the dummy cookie to the user 132 to be stored on the user's 132 machine. The dummy cookie stored on the user's 132 machine can also be used to detect impermissibly copying of user data lists, as described, for example, in the discussion of state $D_2$, below.

In state $D_1$, the third party advertiser 136 performs a data synchronization with the data exchange 102. The data being synchronized may include the dummy cookie. In some examples, in general, a third party advertiser 136 may synchronize its data (e.g., user data lists under the control of the third party advertiser 136) so that the synchronized data can be used by the data exchange 102 and/or the ad exchange 120 to target content to users 132. That is, in some examples, one or both of the ad exchange 120 and the data exchange 102 may require access to the user data lists associated with the third party advertiser 136 in order to target content to users based on those user data lists. Because the third party advertiser 136 is not aware that it has both extracted and stored a dummy cookie from the ad request in state B and has uploaded the dummy cookie to the data exchange 102 in state $D_1$, the third party advertiser 136 may unwittingly and/or automatically provide evidence of its malicious activities to the data exchange 102.

In state E, an audit engine 138 associated with the data exchange 102 can use the dummy cookie obtained in state $D_1$ to determine that an event has occurred. In some examples, because the dummy cookie is a uniquely identifiable piece of data, the audit engine 138 can match the identity of the dummy cookie to a stored list of dummy cookies to infer that the third party advertiser 136 has impermissibly copied data from the user data lists to which it has subscribed. The audit engine 138 may provide functionality that is integrated with the data exchange 102, or its functionality can be a provided on one or more separate devices or applications. Upon the detection of an event (e.g., an event representative of a violation of one or more seller-defined terms of data use, one or more laws, or one or more terms defined by the data exchange 102), the audit engine 138 can take a number of actions. For example, the audit engine 138 may automatically notify one or more administrators of the data exchange 102 and/or one or more data sellers that the violation has occurred, or may automatically suspend the third party advertiser's 136 access to the ad exchange 120 and/or the third party advertiser's 136 access to the data exchange 102. The audit engine 138 may also be configured to track and aggregate the violations by a third party advertiser 136 so that an event is only identified after a predetermined amount of evidence has been collected and analyzed.

In some examples, the audit engine 138 can use a dummy cookie provided to the ad exchange by the user 132 in state $D_2$. For example, the dummy cookie provided to the user 132 can be configured to expire or be deleted from the user's machine relatively quickly (e.g., after one ad impression has been presented to a user, or after a short period of time has expired). In some examples, in order to collect user information, advertisers (e.g., the third party advertiser 136) can place one or more pixels that can be used to associate user cookies with one or more user data lists. In some examples, the term "pixels" may refer to code that can be executed by a user's 132 browser to result in a request being sent to a server, such as the ad exchange 120 or the data exchange 102. The pixels do not necessarily have a visible impact on the page presented in the user's 132 browser, but can be used for data collection. May be better to call them pixel-tags. For example, by placing a pixel, cookie, or other data item on the user's 132 machine, can be caused to contact the data exchange 102 and request that the user 132 be added to a particular user data list specified by the third party advertiser 136. In this example, however, the third party advertiser 136 has unknowingly set a dummy cookie on the user's 132 machine through the ad exchange 120. As a result, when the user 132 contacts the ad exchange 102 in state $D_2$, the audit engine 138 may detect the presence of the dummy cookie, and the user 132 will not be added to the specified user data list. The data exchange 102 can then replace the dummy cookie on the user's machine with a different cookie in order to capture a different intent from the user.

As described above, if the audit engine 138 detects the presence of a dummy cookie provided in state $D_2$, it may determine that an event has occurred. Upon the detection of an event (e.g., an event representative of a violation of one or more seller-defined terms of data use, one or more laws, or one or more terms defined by the data exchange 102), the audit engine 138 can take a number of actions. For example, the audit engine 138 may automatically notify one or more administrators of the data exchange 102 and/or one or more data sellers that the violation has occurred, or may automatically suspend the third party advertiser's 136 access to the ad exchange 120 and/or the third party advertiser's 136 access to the data exchange 102. The audit engine 138 may also be configured to track and aggregate the violations by a third party advertiser 136 so that an event is only identified after a predetermined amount of evidence has been collected and analyzed.

In some examples, the audit engine 138 can determine that an event has occurred without providing dummy cookies to either the third party advertiser 136 or the user 132. For example, if a third party advertiser 136 has impermissibly constructed a user data list by copying data from a user data list to which it has subscribed, the third party advertiser 136 may still attempt to perform the synchronization operation shown in state $D_1$ in order to target content to users 132 based on the pirated user data list. After the pirated user data list (or a portion thereof) has been provided to the data exchange 102, the audit engine 138 may compare some or all of the data on the pirated user data list with the legitimate user data lists stored on the data exchange 102.

In some examples, the audit engine 138 attempts to determine an amount of similarity between the pirated user data list and one or more of the legitimate user data lists and, if the similarity exceeds a threshold similarity, the audit engine 138 may determine that an event has occurred. For example, because it is highly unlikely that two user data lists would include more than 90% of the same data, the audit engine 138 may determine that an event has occurred if, upon comparing two user data lists, the audit engine 138 determines that, for example, 92% of the data on the pirated user data list is identical to data on a legitimate user data list. In this example, 90% was used as an example of a threshold level of similarity.

In determining whether an event has occurred, the audit engine 138 may also determine whether any of the legitimate lists have been licensed, purchased, and/or rented by the third party advertiser 136 at any time in the past. If the audit engine 138 determines that the third party advertiser 136 has had previous access to the legitimate list to which the pirated list bears a substantial similarity, the presumption that the third party advertiser 136 has impermissibly copied user list data can be strengthened.

The auditing techniques described above can each be used alone or in combination with one another. For example, dummy cookies could be provided to the data exchange 102 as in both states $D_1$ and $D_2$, and the audit engine 138 could attempt to determine the occurrence of an event based on a detection of a dummy cookie provided by either the third party advertiser 136 or the user 132. At the same time, the audit engine 138 may use the user data list comparison techniques described above to attempt to identify any pirated user data lists associated with the third party advertiser 136. Combining the auditing techniques described above can provide redundancy in the auditing process by allowing the auditing engine 138 to proactively identify pirated user data lists (e.g., using the comparison approach) and to also rely on the eventual identification of dummy cookies received from one or more sources.

Figure 2:
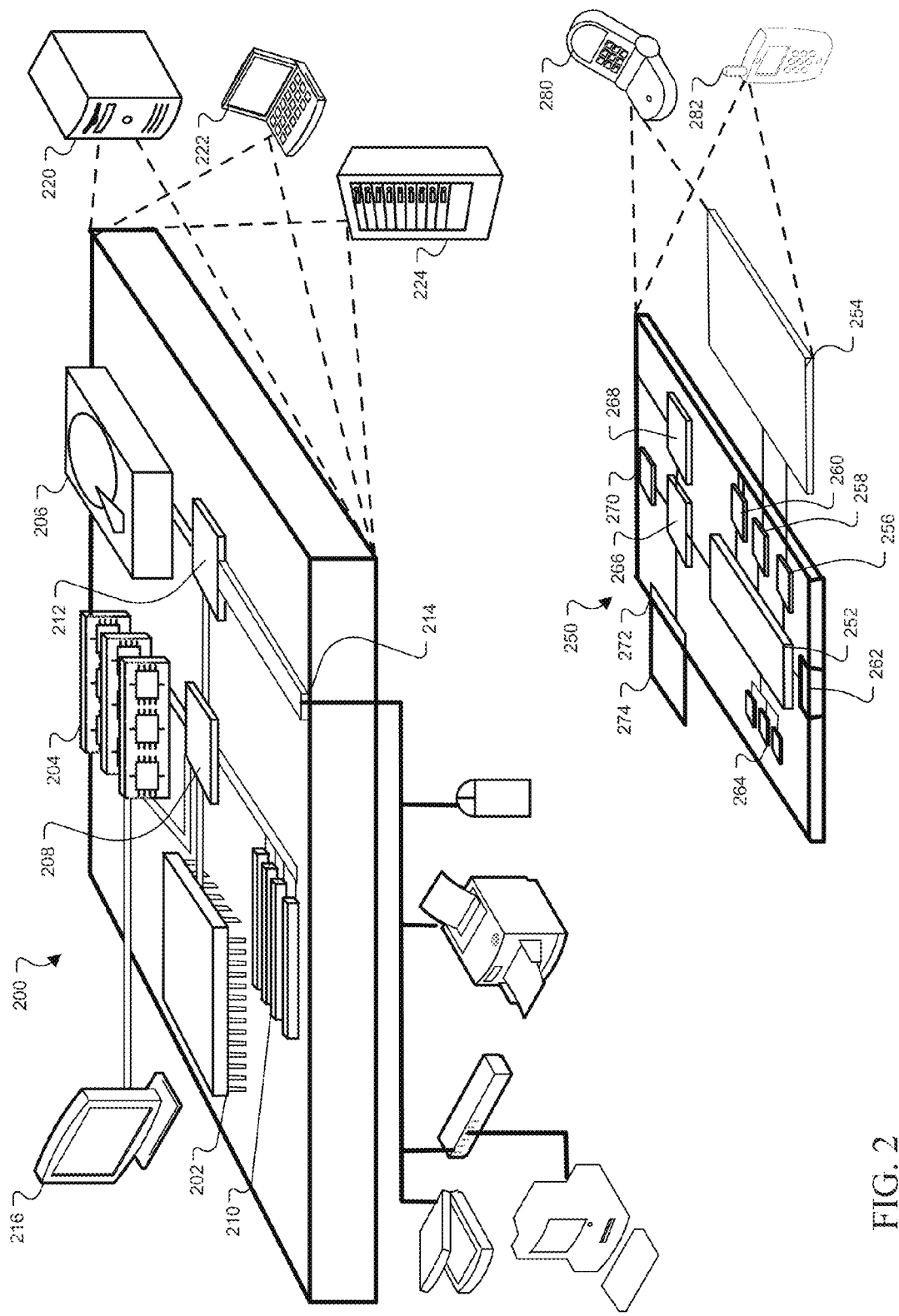
FIG. 2 shows an example of a computer device and a mobile computer device that can be used to implement the techniques described here.

FIG. 2 shows an example of a generic computer device 200 and a generic mobile computer device 250, which may be used with the techniques described here. For example, one or more of the devices shown in FIG. 2 may be used to implement any of the functionality described herein, either in whole or in part. For example, the devices shown in FIG. 2 can implement the functionality of the data exchange 102, the data sellers 104, the data buyers 106, the ad exchange 122, the third party advertiser 136, the user 132, the audit engine 138, and/or any other devices or functionality described in this patent application.

Computing device 200 is intended to represent various forms of digital computers, such as laptops, desktops, workstations, personal digital assistants, servers, blade servers, mainframes, and other appropriate computers. Computing device 250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Alternatively, components from computing device 200 may be combined with other components in a mobile device (not shown), such as device 250. Each of such devices may contain one or more of computing device 200, 250, and an entire system may be made up of multiple computing devices 200, 250 communicating with each other.

Computing device 250 includes a processor 252, memory 264, an input/output device such as a display 254, a communication interface 266, and a transceiver 268, among other components. The device 250 may also be provided with a storage device, such as a microdrive or other device, to provide additional storage. Each of the components 250, 252, 264, 254, 266, and 268, are interconnected using various buses, and several of the components may be mounted on a common motherboard or in other manners as appropriate.

The processor 252 can execute instructions within the computing device 250, including instructions stored in the memory 264. The processor may be implemented as a chipset of chips that include separate and multiple analog and digital processors. The processor may provide, for example, for coordination of the other components of the device 250, such as control of user interfaces, applications run by device 250, and wireless communication by device 250.

Processor 252 may communicate with a user through control interface 258 and display interface 256 coupled to a display 254. The display 254 may be, for example, a TFT LCD (Thin-Film-Transistor Liquid Crystal Display) or an OLED (Organic Light Emitting Diode) display, or other appropriate display technology. The display interface 256 may comprise appropriate circuitry for driving the display 254 to present graphical and other information to a user. The control interface 258 may receive commands from a user and convert them for submission to the processor 252. In addition, an external interface 262 may be provide in communication with processor 252, so as to enable near area communication of device 250 with other devices. External interface 262 may provide, for example, for wired communication in some implementations, or for wireless communication in other implementations, and multiple interfaces may also be used.

The memory 264 stores information within the computing device 250. The memory 264 can be implemented as one or more of a computer-readable medium or media, a volatile memory unit or units, or a non-volatile memory unit or units. Expansion memory 274 may also be provided and connected to device 250 through expansion interface 272, which may include, for example, a SIMM (Single In Line Memory Module) card interface. Such expansion memory 274 may provide extra storage space for device 250, or may also store applications or other information for device 250. Specifically, expansion memory 274 may include instructions to carry out or supplement the processes described above, and may include secure information also. Thus, for example, expansion memory 274 may be provide as a security module for device 250, and may be programmed with instructions that permit secure use of device 250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264, expansion memory 274, memory on processor 252, or a propagated signal that may be received, for example, over transceiver 268 or external interface 262.

Device 250 may communicate wirelessly through communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, GPS (Global Positioning System) receiver module 270 may provide additional navigation- and location-related wireless data to device 250, which may be used as appropriate by applications running on device 250.

Device 250 may also communicate audibly using audio codec 260, which may receive spoken information from a user and convert it to usable digital information. Audio codec 260 may likewise generate audible sound for a user, such as through a speaker, e.g., in a handset of device 250. Such sound may include sound from voice telephone calls, may include recorded sound (e.g., voice messages, music files, etc.) and may also include sound generated by applications operating on device 250.

The computing device 250 may be implemented in a number of different forms, as shown in the figure. For example, it may be implemented as a cellular telephone 280. It may also be implemented as part of a smartphone 282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   electronically registering a plurality of data sellers with a computer-implemented data exchange;
   electronically registering a plurality of data buyers with the computer-implemented data exchange;
   mediating data sharing arrangements between pairs of the data buyers and data sellers, the arrangements defining prices and permitted uses of a first data list provided by a data seller to a data buyer, the first data list being for use in distributing content to users;
   providing access to the first data list to the data buyer for use in distributing content items to users, the first data list including at least one dummy item, the at least one dummy item being uniquely identifying;

receiving additional data associated with the data buyer that has been uploaded for use in distributing content items to users by the data buyer, the additional data including the at least one dummy item;

determining, by one or more computer processors and based at least in part on the at least one dummy item being included in the additional data, that the data buyer has violated one or more of the permitted uses of the first data list; and providing, to one or more data sellers, a notification that the data buyer has violated one or more of the permitted uses of the first data list;

wherein the at least one dummy item comprises a dummy cookie.

2. The method of claim 1, wherein the additional data comprises a second data list, and wherein the determining comprises comparing the second data list to one or more additional data lists to determine whether a similarity exists between the second data list and the one or more additional data lists.

3. The method of claim 2, further comprising identifying the data buyer as being in violation of the one or more permitted uses of the first data list when the similarity exceeds a threshold.

4. The method of claim 1, wherein the first data list comprises a plurality of user identities and one or more characteristics associated with the plurality of user identities.

5. The method of claim 4, wherein the one or more characteristics comprise Internet browsing habits associated with the plurality of user identities.

6. The method of claim 1, wherein the dummy cookie is received from the data buyer.

7. The method of claim 6, wherein determining that the data buyer has violated one or more of the permitted uses of the first data list comprises detecting a possession of the dummy cookie by the data buyer.

8. The method of claim 7, wherein detecting possession of the dummy cookie comprises performing a data synchronization operation with the data buyer.

9. The method of claim 1, wherein the dummy cookie is received from a user.

10. The method of claim 9, wherein determining that the data buyer has violated one or more of the permitted uses of the first data list comprises determining that the data buyer has transmitted the dummy cookie to the user.

11. A non-transitory computer storage device storing executable instructions that, when executed, cause a processing device to perform operations comprising:

electronically registering a plurality of data sellers with a computer-implemented data exchange;

electronically registering a plurality of data buyers with the computer-implemented data exchange;

mediating data sharing arrangements between pairs of the data buyers and data sellers, the arrangements defining prices and permitted uses of a first data list provided by a data seller to a data buyer, the first data list being for use in distributing content to users;

providing access to the first data list to the data buyer for use in distributing content items to users, the first data list including at least one dummy item, the at least one dummy item being uniquely identifying;

receiving additional data associated with the data buyer that has been uploaded for use in distributing content items to users by the data buyer, the additional data including the at least one dummy item;

determining, based at least in part on the at least one dummy item being included in the additional data, that the data buyer has violated one or more of the permitted uses of the first data list; and providing, to one or more data sellers, a notification that the data buyer has violated one or more of the permitted uses of the first data list;

wherein the at least one dummy item comprises a dummy cookie.

12. A system comprising computer memory storing instructions, and one or more processing devices to execute the instructions to implement elements comprising:

a registration engine to:
electronically register a plurality of data sellers with a computer-implemented data exchange; and
electronically register a plurality of data buyers with the computer-implemented data exchange;

a mediation engine to mediate data sharing arrangements between pairs of the data buyers and data sellers, the arrangements defining prices and permitted uses of a first data list provided by a data seller to a data buyer, the first data list being for use in distributing content to users;

a data list manager to:
provide access to the first data list to the data buyer for use in distributing content items to users, the first data list including at least one dummy item, the at least one dummy item being uniquely identifying; and
receive additional data associated with the data buyer that has been uploaded for use in distributing content items to users by the data buyer, the additional data including the at least one dummy item; and an audit engine to:
determine, based at least in part on the at least one dummy item being included in the additional data, that the data buyer has violated one or more of the permitted uses of the first data list; and
provide a notification that the data buyer has violated one or more of the permitted uses of the first data list;
wherein the at least one dummy item comprises a dummy cookie.

* * * * *